Jan. 14, 1969   G. SCHIFFER   3,421,189
DEVICE FOR LATERALLY AND LONGITUDINALLY
STRETCHING WEB MATERIAL
Filed April 6, 1967

INVENTOR:

Günter Schiffer

United States Patent Office 3,421,189
Patented Jan. 14, 1969

3,421,189
DEVICE FOR LATERALLY AND LONGITUDINALLY STRETCHING WEB MATERIAL
Günter Schiffer, Krefeld-Bockum, Germany, assignor to Joh. Kleinewefers Sohne Maschinenfabrik, Krefeld, Germany
Filed Apr. 6, 1967, Ser. No. 629,005
Claims priority, application Germany, Apr. 7, 1966, K 58,958
U.S. Cl. 26—54                          7 Claims
Int. Cl. D06c 3/06

ABSTRACT OF THE DISCLOSURE

A device for longitudinally stretching web material including an endless elastic belt mounted for movement about supporting rollers and spaced pressure rollers for retaining the web material against a turn of the belt about one of the supporting rollers. The material is stretched between the pressure rollers, one of which may be movable to vary the extent of the stretching. Lateral stretching of the web material may be simultaneously effected by the addition of or the replacement of a pressure roller by an undulated comb roller.

---

The present invention relates to a device for longitudinally stretching webs of different kinds, and especially for textile webs.

While the art of stretching webs along the width thereof furnishes numerous devices, such as arched bars, lattice distenders, spiral rollers, comb rollers and, above all, clip chains, the longitudinal stretching of textiles has heretofore been hardly practiced in view of the lack of appropriate devices. On the other hand it is known, for instance, in connection with the processing of synthetic material to stretch foils longitudinally on complicated chain drawing mechanisms on which the distances between the clips continually increases in conformity with the movement in longitudinal direction. According to another method, the foil is stretched while passing through a plurality of serially arranged reversing and transporting rollers which rotate with increasing speed.

The stretching of textiles, especially of knitted material, is necessary in many instances in order to obtain a high class article. Thus, for instance, the stretching in the direction of width is carried out simultaneously in combination with a chemical process, as for instance during mercerizing, because in this way in addition to obtaining a better lustre of the material, also the strength will be increased. Therefore, it would be ideal if in connection therewith it were possible simultaneously to carry out a considerable longitudinal stretching operation because the material would in this way obtain a desired shrinkage resistance as well as a high lustre effect. Since, particularly when heavy material is involved, the stretching of textiles requires considerably larger forces than is the case with thin synthetic foils, such heretofore known longitudinal stretching machines have not been employed in connection with textiles. It is additionally to be considered that the material must during the entire stretching process firmly engage rollers in order to prevent any reduction in the width as would be caused by the action in the longitudinal direction, which reduction in width would occur with a free moving web.

It is, therefore, an object of the present invention to provide a longitudinal stretching device which will meet the high requirements in connection with the stretching of knitted material.

It is another object of this invention to provide a stretching device as set forth in the preceding paragraph which is relatively simple in construction and application and can easily be employed whenever needed.

These and other objects and advantages of the invention will appear more clearly from the following specification in connection with the accompanying drawing, in which:

FIG. 1 diagrammatically illustrates a stretching belt according to the invention with deviating and pressing rollers.

The device according to the present invention comprises primarily an endless stretching belt of an elastic material, as for instance rubber, or the like, the wall thickness of which amounts to about from ten to one hundred times the thickness of the material to be stretched. One deviating or reversing roller for said belt has such a small diameter that the outer layer thereof which carries the material will, in view of the difference in the radii over the inner layer, be lengthened whereby the material held between the pressure and withdrawing rollers is stretched.

According to a further development of the present invention, within the range of the material located on the stretching belt, there are provided one or more comb rollers by means of which simultaneously a stretching in the direction of the width of the material is effected.

Figure 1:
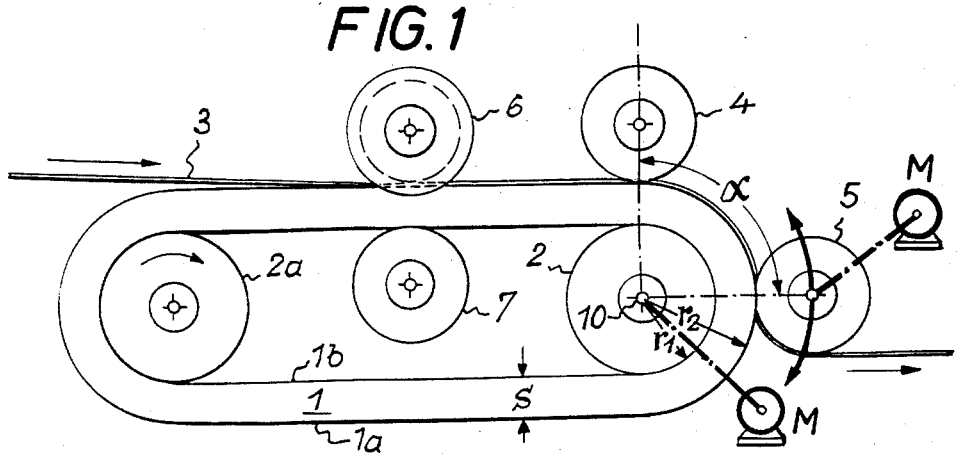

Referring now to the drawing in detail, it will be noted from FIG. 1 that an endless belt 1 of elastic material, for instance rubber, or a soft synthetic material, as for instance microporous polyurethane, has at least the width of the web to be treated and passes over two reversing rollers 2 and 2a. Belt 1 while coming from the left-hand side with regard to the drawing carries the web 3 to be processed along a flat path. Web 3 is pressed by a pressure roller 4 and a withdrawing roller 5 against the respective adjacent belt section and held fast thereagainst. The wall thickness "s" of the stretching belt amounts to a multiple, approximately from ten to one hundred times, the thickness of the web 3 to be processed. Furthermore, the reversing roller 2 has such a small diameter that, when the stretching belt passes over this reversing roller, due to the difference in the radii between the radius $r_2$ of the outer belt layer 1a and the radius $r_1$ of the inner belt layer 1b (or the outer radius of the reversing roller 2), such considerable difference will occur that the outer belt layer 1a and the material supported thereby, within the range of the arc, will be considerably longer than the inner layer 1b and thus the material will be stretched. In this connection it is, of course, necessary that the pressure roller 4 at the start of the arc and the withdrawing roller 5 displaced by approximately 90° with regard to the pressure roller 4 will press the material against the stretching belt to such an extent that it cannot slide relative thereto. For purposes of a better adherence of the material to the belt, additional pressure rollers may be provided, as for instance a pressure roller, shown as a comb roller 6, and a corresponding supporting roller 7.

The extent of the stretching or the angular path α may be varied at will by tilting the withdrawing roller 5 about the axis 10 of the reversing roller 2 in the direction of the double arrow. The longitudinal stretching device may be further improved by the provision of comb rollers for simultaneously effecting a stretching of the material in the direction of the width. To this end, a comb roller 6 may be provided. If desired, the pressure roller 4 and the withdrawing roller 5 may be designed as comb rollers, in which instance the rollers in cross section will be the same as comb roller 6, shown in FIGURE 2. Advantageously the comb depth beginning at the roller 6 will increase gradually.

Figure 2:
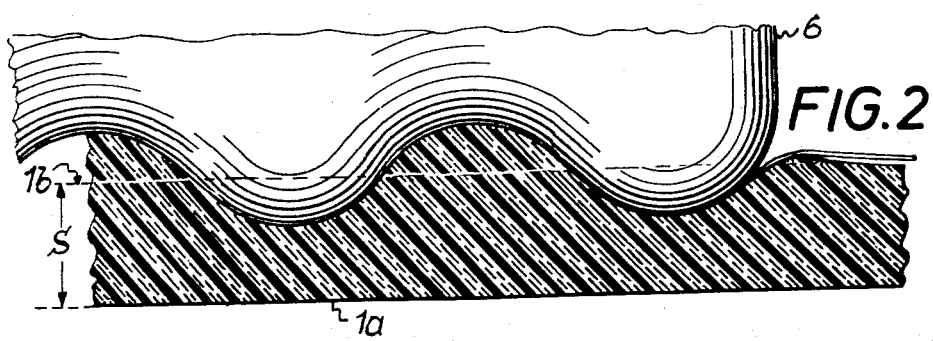
FIG. 2 illustrates on a somewhat larger scale than FIG. 1 the action of a comb roller.

FIGURE 2 shows the cooperation between the belt 1, comb roller 6, and supporting roller 7 whereby the material is pressed into the grooves of the comb roller and uniformly stretched widthwise thereby.

Figure 3:
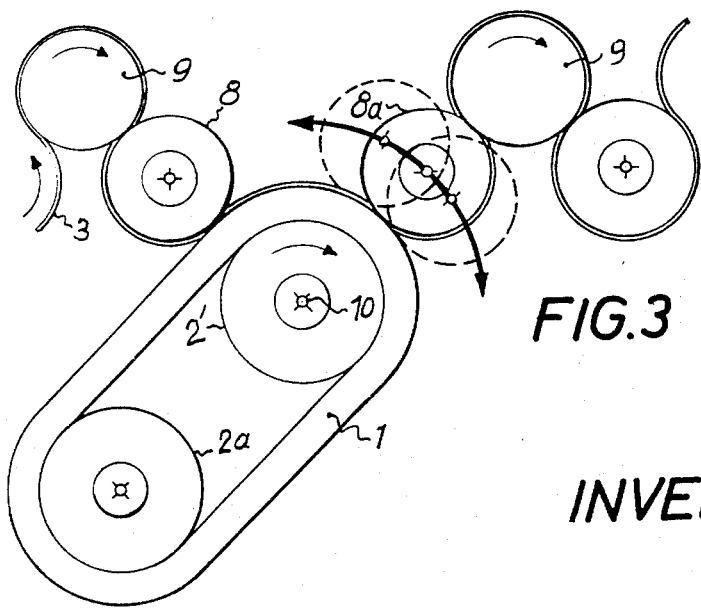
FIG. 3 shows the arrangement of a stretching belt in a chainless mercerizing machine.

FIG. 3 shows the employment of a longitudinal stretching device according to the invention in a chainless mercerizing machine by building the device into the path between the mercerizing rollers 8 and 9. One of the lower rollers 2' will serve as the reversing roller for the stretching belt 1, while the adjacent lower rollers engage the same and form the pressure roller 8 and the withdrawing roller 8a. In this way, the web 3 passing over the lower rollers and the upper rollers 9 of the mercerizing machine is strongly stretched between the two lower rollers 8 and 8a. Also in this instance the degree of stretching may be varied by tilting or displacing the lower roller 8a about the axis 10 of the supporting roller 2'.

It is, of course, to be understood that the present invention is, by no means, limited to the particular constructions shown in the drawing but also comprises any modifications within the scope of the appended claims.

What I claim is:

1. An apparatus for longitudinally stretching web material, especially textiles, paper, and stretchable synthetic material, which includes: at least two spaced supporting rollers, an endless belt of elastic material tightly looped around said supporting rollers for continuous movement therearound and for supporting on its outside the web material to be stretched longitudinally, the wall thickness of said belt being within the range of from ten to one hundred times the thickness of the web material to be stretched, and pressure rollers arranged in spaced relationship to each other on the outside of said belt directly engaging the web material and holding the respective section of web material passing over the outside of said belt within the range of one of said supporting rollers in firm contact with the outside of the respective belt section passing thereabout, said pressure rollers extending across the width of said material and including a first pressure roller pressing said material against said belt ahead of its angular movement about one of said supporting rollers, and a second pressure roller angularly spaced from said first pressure roller and pressing said material against said belt and said one of said supporting rollers following angular movement about said one of said supporting rollers to bring about a stretching of the respective web section between the pressure rollers.

2. An apparatus according to claim 1, in which said one supporting roller has a relatively small diameter so that the outer zone of said belt passing over said one supporting roller is stretched considerably with regard to the respective adjacent inner zone belt portion passing over the said one supporting roller.

3. An apparatus according to claim 1, in which at least one of said pressure rollers is movable relative to the other for selectively shortening and lengthening the respective curved web section held by said pressure rollers against the curved belt section whereby the stretch in the material being treated may be varied.

4. An apparatus according to claim 1, which includes comb roller means extending across the width of said belt and operable firmly to press against the respective web section on said belt below said comb roller means to bring about transverse stretching of the respective web section below said comb roller means.

5. An apparatus according to claim 1, in which at least one of said pressure rollers is a comb roller with an ondulated surface facing said belt and with the ondulations extending transverse to said belt.

6. An apparatus according to claim 1, which includes an additional roller cooperating with said first pressure roller to press against the web material on said belt.

7. An apparatus according to claim 1, which includes separate driving means for said one supporting roller and said second pressure roller.

References Cited

UNITED STATES PATENTS

| 2,021,975 | 11/1935 | Wrigley et al. | 26—18.6 |
| 2,120,536 | 6/1938 | Woodhead | 26—18.6 |

FOREIGN PATENTS

| 1,595 | 1856 | Great Britain. |

ROBERT R. MACKEY, *Primary Examiner.*

U.S. Cl. X.R.

26—18.6